United States Patent [19]

Helgorsky et al.

[11] 4,255,394
[45] Mar. 10, 1981

[54] PROCESS FOR THE SEPARATING OF RARE EARTHS

[75] Inventors: Jacques Helgorsky, Frepillon; Alain Leveque, Paris, both of France

[73] Assignee: Rhone-Poulenc Industries, Paris, France

[21] Appl. No.: 15,296

[22] Filed: Feb. 26, 1979

[30] Foreign Application Priority Data

Mar. 10, 1978 [FR] France .................................. 78 06926

[51] Int. Cl.³ .............................................. C01F 17/00
[52] U.S. Cl. .......................... 423/21.5; 423/DIG. 14; 75/101 BE
[58] Field of Search .............. 423/21, 658.5, DIG. 14, 423/DIG. 19, 21.5; 75/101 BE

[56] References Cited

U.S. PATENT DOCUMENTS

| | | | |
|---|---|---|---|
| 3,637,711 | 1/1972 | Budde et al. ................ | 423/DIG. 14 |
| 4,012,362 | 3/1977 | Reiff et al. ....................... | 75/101 BE |
| 4,065,455 | 12/1977 | Mattison ...................... | 423/DIG. 14 |
| 4,066,652 | 1/1978 | Hartlage ......................... | 75/101 BE |

OTHER PUBLICATIONS

Pyatnitskii et al., "Journal of Anal. Chem., U.S.S.R." vol. 25, 1970, pp. 445-450. (Translation, pp. 381-385, UDC543.70 Cited).

Moeller et al., "Anal. Chemistry", vol. 22, 1950, pp. 1393-1397.

Leveque et al., "Comple rendu Acad. Des Sciences", vol. 273, Series C, pp. 1073-1076, Oct. 1971.

Primary Examiner—Herbert T. Carter

[57] ABSTRACT

A process is provided for separating, by solvent extraction, metal compounds contained in aqueous solutions. The aqueous solution is contacted with an organic phase containing at least one substituted hydroquinoline. The process of the invention is particularly applicable to the separation of at least one element selected from among the group consisting of the rare earths and yttrium from an aqueous solution containing it.

14 Claims, No Drawings

PROCESS FOR THE SEPARATING OF RARE EARTHS

BACKGROUND OF THE INVENTION

This invention relates to a process of separating, by solvent extraction, metal compounds contained in aqueous solutions. More particularly, it relates to the separating by means of hydroxyquinolines of at least one element, selected from the group consisting of the rare earths and yttrium, from an aqueous solution containing it.

It is well known that the rare earths, that is to say, the lanthanides, which have atomic numbers of between 57 and 71, and yttrium, are difficult to separate from one another due to the similarity of their properties.

It has already been proposed to separate the rare earths and yttrium contained in aqueous solutions by subjecting them to extraction with an organic solution comprising, in particular, either neutral or acid organophosphorus compounds or amines or quaternary ammonium salts, or else carboxylic acids. However, such processes are not always entirely satisfactory since, in certain cases, the solvents used do not have sufficient separation factors or may lead to extensive operating expenses, particularly in case of the regeneration of the acid organophosphorus compounds.

It has also already been proposed, in accordance with an article published in *Compte rendu hebdomadaire de l'Academie des Sciences de Paris*, Volume 273, of Oct. 27, 1971, Series C, pages 1073 to 1076, selectively to extract europium in bivalent state from the other rare earths having a degree of oxidation of +III by [7-α(O-carbomethoxyanilino)benzyl]8-hydroxyquinoline or CMAB-oxine in solution in chloroform. In accordance with the authors of said article, the results obtained are different from those expected, since the $Eu^{3+}$ ion is extracted slightly before the $Eu^{2+}$ ion. However, the separation of $Eu^{2+}$ and $Eu^{3+}$ should be possible by superimposing on the extraction reaction a reaction of formation of complexes in the aqueous phase with EDTA (ethylene diamine tetraacetic acid).

The +III degree of oxidation is the normal form of the rare earth ions, but some elements have the possibility of being stabilized easily at a higher degree of oxidation (+IV in the case of cerium and praseodymium) or lower degree of oxidation (+II in the case of europium and samarium). The change in the degree of oxidation corresponds, in addition to the variation of the ionic radius of the ion in question, to substantial variations in the chemical properties. It is these differences, which are well known to the man skilled in the art, which it has been attempted to utilize in the process described above for separating europium in bivalent state from the other rare earths in trivalent state. In addition to the apparent lack of success of the results obtained, the solution recommended has the drawback of requiring the use of a complexing agent in addition to the extracting agent.

The values of the extraction constants of certain rare earths with oxine (8-hydroxyquinoline) have already been mentioned in the literature (Pyatnicky I. V. and Gavrilova E. F., *Zh. Anal. Khim.*, Volume 25, page 445, 1970). The values of the extraction constants indicated for neodymium and samarium were determined during the course of different experiments. The value of the extract constants obtained from a given series of experiments is also given in this article for dysprosium, holmium, erbium, thulium, and ytterbium. From these sparse results, which come in most cases from a very inaccurate determination, the man skilled in the art can in no way prejudge the selectivity of oxine for the separation by extraction of at least one rare earth from an aqueous solution containing a mixture of rare earths.

Moreover, it can be noted that oxine has a large number of drawbacks from an industrial standpoint, in particular, too great a solubility in water which results in substantial losses, low capacity of charge, and low solubility in the organic solvents used industrially in liquid-liquid extractions, such as kerosene or Solvesso.

By the present invention it has been discovered that a new class of solvents obviates the said drawbacks and makes it possible to effect the separation from an aqueous solution of at least one element selected from among the group consisting of the rare earths and yttrium under particularly advantageous conditions.

More precisely, the process in accordance with the present invention makes it possible to separate from an aqueous solution at least one element selected from the group consisting of the rare earths and yttrium in the trivalent state, and to do so with excellent selectivity, due to the fact that the separation factors are larger and increase as a whole in the direction of the increasing atomic numbers of the rare earths, that is to say, from lanthanum to lutetium, yttrium occupying an intermediate position.

It is, accordingly, a principal object of the present invention to provide a novel process for separating rare earths and yttrium, one from another, from their aqueous solutions.

Other objects of the invention will be apparent to those skilled in the art from the present description.

GENERAL DESCRIPTION OF THE INVENTION

The present invention concerns a method for the separation by extraction from an aqueous solution of at least one element selected from among the group consisting of the rare earths and yttrium, characterized by the fact that the said aqueous solution containing the rare earths and yttrium in trivalent state is contacted with an organic phase comprising at least one substituted hydroxyquinoline.

The substituted hydroxyquinoline, in accordance with the process of the invention, extracts, by complexing, at least one of the elements of the group consisting of the rare earths and yttrium from mixtures thereof in aqueous solution into an organic phase. Under the conditions of the process of the invention, the rare earth or yttrium extracted must be more soluble in the organic phase than in the aqueous phase.

The substituted hydroxyquinolines which are suitable for the purposes of the invention are, in particular, substituted hydroxyquinolines of the general formula:

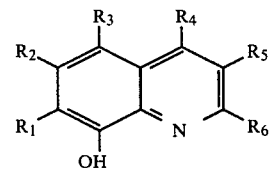

in which $R_1$, $R_2$, $R_3$, $R_4$, $R_5$ and $R_6$, which may be identical or different, are selected from the group consisting of hydrogen, a halogen, and at least one substituted or unsubstituted alkyl, alkenyl, cycloaliphatic or aromatic radical, with the proviso that all of $R_1$, $R_2$, $R_3$, $R_4$, $R_5$, $R_6$ cannot simultaneously represent hydrogen.

The substituted hydroxyquinolines which are suitable for the purpose of the invention are, in particular and preferably, those of the general formula:

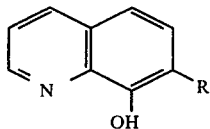

in which R is an alkenyl radical, possibly substituted, which preferably contains from about 2 to 20 carbon atoms.

Among the hydroxyquinolines which are particularly suitable for the process of the invention are:

(1) the α-alkenyl 8-hydroxyquinolines having the general formula:

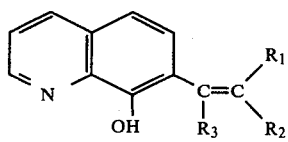

in which $R_1$, $R_2$, $R_3$ represent a hydrogen or a hydrocarbon group, optionally substituted; and (2) the β-alkenyl 8-hydroxyquinolines having the general formula:

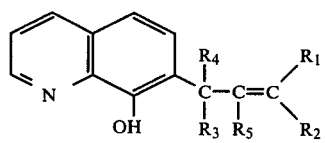

in which $R_1$, $R_2$, $R_3$, $R_4$, $R_5$ represent a hydrogen or a hydrocarbon group, optionally substituted.

There are also particularly well suited for the process of the invention, the alkyl 8-hydroxyquinolines having the general formula:

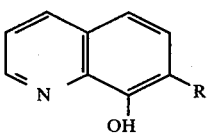

in which R represents an alkyl and/or cycloaliphatic radical optionally substituted, containing preferably about 1 to 20 carbon atoms.

There are also suitable for the process of the invention, the 8-hydroxyquinolines of the general formula:

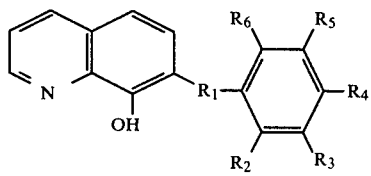

in which $R_1$ represents a hydrocarbon radical, optionally substituted, and $R_2$, $R_3$, $R_4$, $R_5$, $R_6$ represent a hydrogen or a hydrocarbon group.

There are also suitable for the purposes of the invention, the 8-hydroxyquinolines of the general formula:

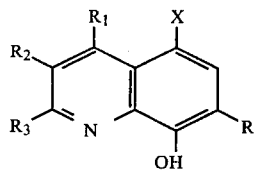

in which X is a halogen, R is an alkyl or alkenyl radical containing preferably about 5 to 20 carbon atoms, $R_1$, $R_2$, $R_3$, which are identical or different, being selected from among the group comprising hydrogen and alkyl groups having preferably about 1 to 4 carbon atoms.

The organic phase employed in the extraction process in accordance with the invention contains generally, in addition to the substituted hydroxyquinoline, an organic diluent which does not alter the complexing properties of the substituted hydroxyquinoline of the invention process. As diluents capable of being used, mention may be made of the aromatic hydrocarbons, such as xylene, toluene, benzene, diethylbenzene or petroleum cuts of the Solvesso type (a registered trademark of Exxon); the aliphatic hydrocarbons, such as hexane, cyclohexane, and the petroleum cuts of the kerosene type; the halogenated hydrocarbons, such as chloroform, carbon tetrachloride, the petroleum ethers, etc. They can be used alone or in mixtures.

The organic phase in accordance with the process of the invention may also contain various modifying agents, one of the essential purposes of which is to improve the hydrodynamic properties of the system without altering the complexing properties of the substituted hydroxyquinoline of the invention process. Among the compounds which are well suited, mention may be made, in particular, of the substances with an alcohol function and, in particular, higher alcohols having between about 4 and 15 carbon atoms and higher phenols, as well as various other compounds, such as certain phosphoric esters, such as tributylphosphate, the phosphine oxides, or the sulfoxides. A proportion of between about 3 and 20 percent by volume, based on the organic phase, is generally favorable.

The extraction power of the organic phase or solution with respect to the rare earths and yttrium increases when the concentration of the substituted hydroxyquinoline of the invention process in the organic phase is increased. However, the separation factors of the elements from each other are not modified substantially by the concentration of the substituted hydroxyquinoline. Thus, the substituted hydroxyquinoline concentration in the organic phase is not a critical factor in the process of the invention and may vary within wide limits.

The aqueous phase, containing the mixture of rare earth and yttrium, which is contacted with the organic phase containing the substituted hydroxyquinoline in accordance with the process of the invention, may contain these elements of the group formed of rare earths and yttrium in the form of perchlorates, nitrates, chlorides, sulfates, or thiocyanates.

The quantity of elements extracted into the organic phase depends on the pH of the aqueous phase treated and varies in accordance with the elements contained therein. In practice, the extraction should be effected at a pH ranging from about 3 to 8. The quantity of the elements extracted can furthermore be adjusted by the addition to the aqueous phase of a base, in particular, ammonia or an alkaline base or hydroxide. In general, the pH to be used is lower within the indicated range the higher the atomic number of the element which it is desired to extract. The process of the invention makes it possible under these conditions to effect the extraction of at least one of the elements of the group formed of the rare earths and yttrium with excellent selectivity. The elements extracted can be separated from the organic phase by contacting the latter with an aqueous solution of an inorganic acid, such as nitric acid, sulfuric acid, hydrochloric acid, or perchloric acid. The amount of acid used for this purpose should be such that the final pH of the aqueous phase is less than about 3.

The process of the invention which makes it possible to effect separations between several elements of the group consisting of the rare earths and yttrium, or between pairs of elements of this group, can be carried out in conventional devices used in the liquid-liquid extraction processes. Such devices generally comprise several stages of mixer-settler systems arranged in conventional manner to effect the operations of extraction, selective washing (stripping), and recovery in aqueous phase of the elements extracted.

SPECIFIC DISCLOSURE OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

800 ml. of an aqueous nitrate solution of rare earths, having a pH of 3, containing 30 g. of gadolinium and 30 g. of terbium per liter, these concentrations being expressed as oxides, are contacted with one liter of an organic phase formed of:
  30 percent hydroxyquinoline "A",
  10 percent n-decanol,
  60 percent kerosene,
the percentages being by volume, referred to the organic phase.

The hydroxyquinoline "A" has the formula:

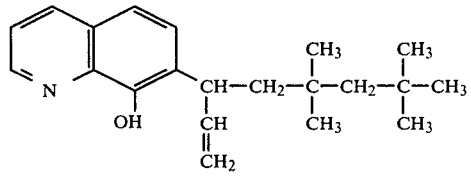

It is the active compound of the product sold by Ashland Chemical Company under the tradename "Kelex 100."

200 ml. of a 2 mol per liter solution of sodium hydroxide are added progressively to the resulting two-phase mixture, with agitation, the pH becoming equal to 5.5. The aqueous and organic phases are separated and analyzed. The concentration, expressed in grams of oxide per liter, in the aqueous phase, are:
  gadolinium: 16.4 g./l.
  terbium: 6.9 g./l.
and, in the organic phase, they are:
  gadolinium: 7.6 g./l.
  terbium: 17.1 g./l.

One, therefore, notes a very substantial enrichment of the aqueous phase in gadolinium and, conversely, of the organic phase in terbium. In other words, the separation factor $F_{Tb/Gd}$, which is defined as the ratio of the partition coefficients of the two elements, is equal to 5.4.

EXAMPLE 2

To illustrate the selectivity of the process of the invention for the separation of at least one element selected from the group consisting of the rare earths and yttrium, the procedure indicated in Example 1 is repeated, again in nitrate medium with hydroxyquinoline "A", using any two elements selected from said group. This makes it possible to determine the separation factors for the pairs in question. In order to present the results obtained, the separation factors of each element are expressed with respect to yttrium, these results being set forth in the following table in which RE symbolizes the rare earth in question.

| RE | Nd | Sm | Eu | Gd | Tb | Dy | Ho | Er | Tm | Yb | Lu |
|---|---|---|---|---|---|---|---|---|---|---|---|
| $F_{RE/Y}$ | 0.022 | 0.34 | 0.69 | 0.56 | 3.0 | 6.4 | 10.1 | 12.3 | 23.7 | 38.6 | 27.4 |

EXAMPLE 3

The procedure described above in Example 2, using the same hydroxyquinoline "A", is repeated, but in chloride medium. The separation factors of each element referred to the yttrium are given in the following table:

| RE | Nd | Sm | Eu | Gd | Tb | Dy | Ho | Er | Tm | Yb | Lu |
|---|---|---|---|---|---|---|---|---|---|---|---|
| $F_{RE/Y}$ | 0.12 | 1.3 | 2.0 | 1.3 | 3.8 | 4.9 | 5.2 | 4.0 | 5.0 | 5.4 | 3.7 |

EXAMPLE 4

Repeating the procedure described above in Example 2, but in a nitrate medium and using instead of hydroxyquinoline "A", hydroxyquinoline "B" of the following formula:

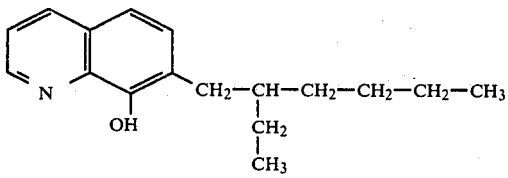

the results set forth below were obtained. The separation factors of each element with respect to the yttrium are given in the following table:

| RE | Nd | Sm | Eu | Gd | Tb | Dy | Ho | Er | Tm | Yb | Lu |
|---|---|---|---|---|---|---|---|---|---|---|---|
| $F_{RE/Y}$ | 0.043 | 0.47 | 0.90 | 0.69 | 3.3 | 6.6 | 9.4 | 9.7 | 18.6 | 23.3 | 17.2 |

EXAMPLE 5

Repeating the procedure described above in Example 2, but with hydroxyquinoline "B" as described in Example 4, above, and in a chloride medium, the separation factors of each element with respect to the yttrium were obtained as set forth in the following table:

| RE | Nd | Sm | Eu | Gd | Tb | Dy | Ho | Er | Tm | Yb | Lu |
|---|---|---|---|---|---|---|---|---|---|---|---|
| $F_{RE/Y}$ | 0.064 | 0.72 | 1.3 | 0.89 | 4.2 | 8.0 | 9.7 | 8.5 | 12.4 | 17.3 | 12.1 |

The values of the separation factors given in the above examples make it possible to calculate the conditions to be used for separating two or more elements taken from the group formed of the rare earths and yttrium in accordance with the conventional liquid-liquid extraction techniques.

As will be apparent to those skilled in the art, other substituted hydroxyquinolines in accordance with the foregoing disclosure may be employed in the foregoing examples. Other organic diluents may be used in the organic phase, as well as employing salts of the rare earths or yttrium with other anions, such as perchlorates, sulfates, or thiocyanates, all in accordance with the foregoing disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process of separating by extraction from an aqueous solution one element from another, said elements being selected from the group consisting of the rare earths and yttrium, said elements existing in the trivalent state, said elements being contained as a mixture of at least two of said elements in said aqueous solution, which process comprises, contacting the said aqueous solution containing said mixture with an organic phase containing at least one substituted hydroxyquinoline having at least one hydrocarbon radical substituent, wherein the pH of said aqueous solution in contact with said organic phase is between about 3 and 8.

2. A process according to claim 1, wherein said substituted hydroxyquinoline is of the general formula:

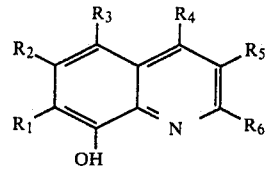

in which $R_1$, $R_2$, $R_3$, $R_4$, $R_5$ and $R_6$, are selected from the group consisting of hydrogen, halogens, and, at least one of which is, an alkyl, alkenyl, cycloaliphatic and aromatic radical, and providing that $R_1$, $R_2$, $R_3$, $R_4$, $R_5$, $R_6$ do not simultaneously represent hydrogen.

3. A process according to claims 1 or 2, wherein said substituted hydroxyquinoline has the general formula:

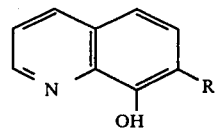

in which R is an alkenyl radical, optionally substituted, containing 2 to 20 carbon atoms.

4. A process according to claims 1 or 2, wherein said substituted hydroxyquinoline has the general formula:

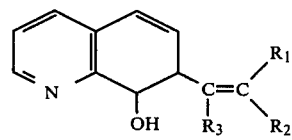

in which $R_1$, $R_2$, $R_3$ represent a member selected from the class consisting of hydrogen and a hydrocarbon group, optionally substituted.

5. A process according to claims 1 or 2, wherein said substituted hydroxyquinoline has the general formula:

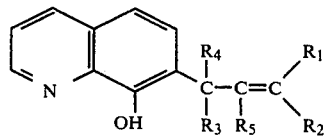

in which $R_1$, $R_2$, $R_3$, $R_4$ and $R_5$ represent a member selected from the class consisting of hydrogen and a hydrocarbon group, optionally substituted.

6. A process according to claims 1 or 2, wherein said substituted hydroxyquinoline has the general formula:

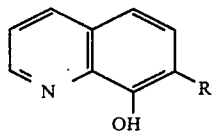

in which R represents a radical, optionally substituted, containing about 1 to 20 carbon atoms and selected from the group consisting of at least one of the alkyl and cycloaliphatic radicals.

7. A process according to claims 1 or 2, wherein said substituted hydroxyquinoline has the general formula:

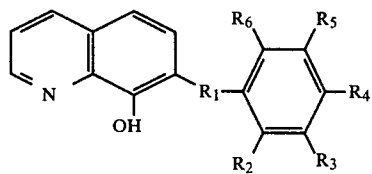

in which $R_1$ represents an alkyl radical, optionally substituted, and $R_2$, $R_3$, $R_4$, $R_5$, $R_6$ represent a member selected from the class consisting of hydrogen and a hydrocarbon group, optionally substituted.

8. A process according to claims 1 or 2, wherein said substituted hydroxyquinoline has the general formula:

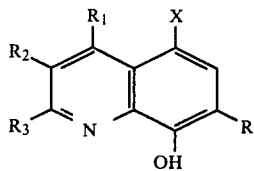

in which X is a halogen, R is a member selected from the class consisting of an alkyl and alkenyl radical containing from about 5 to 20 carbon atoms, $R_1$, $R_2$, $R_3$, which are members selected from the group consisting of hydrogen and alkyl groups having from about 1 to 4 carbon atoms.

9. A process according to claim 1, wherein said organic phase furthermore comprises at least one organic diluent selected from among the group consisting of aromatic hydrocarbons, aliphatic hydrocarbons, halogenated hydrocarbons, petroleum cuts, and petroleum ethers.

10. A process according to claim 1, wherein said organic phase furthermore comprises at least one modifying agent selected from the group consisting of substances having an alcohol function, phosphoric esters, phosphine oxides, and sulfoxides.

11. A process according to claim 1, wherein said elements of the group consisting of the rare earths and yttrium are in the aqueous phase in one of the forms selected from the class consisting of chlorides, nitrates, sulfates, perchlorates, and thiocyanates.

12. A process according to claim 1, wherein the pH of the aqueous phase is adjusted by addition of a base.

13. A process according to claim 1, wherein the elements extracted are then separated from the organic phase by contacting the latter with an aqueous solution of an inorganic acid.

14. A process according to claim 13, wherein said inorganic acid is selected from the group consisting of hydrochloric acid, nitric acid, perchloric acid, and sulfuric acid.

* * * * *